Nov. 8, 1932.   J. M. DAYTON   1,887,400
METER COMPENSATING DEVICE
Filed Oct. 10, 1930   2 Sheets-Sheet 1

Inventor
JAMES M. DAYTON
By [signature]
Attorneys.

Nov. 8, 1932.  J. M. DAYTON  1,887,400
METER COMPENSATING DEVICE
Filed Oct. 10, 1930  2 Sheets-Sheet 2

Inventor
JAMES M. DAYTON.
Attorneys.

Patented Nov. 8, 1932

1,887,400

UNITED STATES PATENT OFFICE

JAMES M. DAYTON, OF TORRINGTON, CONNECTICUT

METER COMPENSATING DEVICE

Application filed October 10, 1930. Serial No. 487,867.

This invention relates to improvements in liquid measuring devices and more particularly proposes a compensating system for flow meters when employed in accurate measuring of liquids.

Flow meters of the type which includes an element positioned in the direct flow of the liquid and operated thereby have been employed for many years in determining quantities of liquid. Usually, however, the requirement as to accuracy is not an especially critical factor. For example, in measuring water and like cheap liquids the tolerance of accuracy is of the order of 2 to 5 per cent. When, however, is is desired to measure more expensive liquids, obviously the tolerance is reduced. With gasoline in particular the laws of some states require a much greater accuracy. In some instances the law requires that there shall not be a greater variation than 3½ cubic inches in the delivery of five standard U. S. gallons with rates of flow which vary from 5 to 20 gallons per minute. Since such liquids are delivered under low heads of pressure, it is essential that the device must be freely fitted to permit easy movement. Hence, losses occur at the loose fittings and these losses must be compensated in the operation of the meter and its parts. In measuring water, for example, this is accomplished by designing the connecting train between the measuring device proper and the registering system so that the reading normally is greater than actually corresponds to the volume and speed of the meter. Since this leakage is not fixed but varies between various meters, it is customary to provide a by-pass from the inlet to the outlet whereby liquid may pass without operating the metering system at all. This by-pass is controlled by an adjustable valve so that the total flow by leakage and through the by-pass may be standardized for all meters of current manufacture, regardless of variations of leakage in the particular meters. However, it is found in practice that the leakage does not bear the same proportion to the total flow at different rates of discharge. This is particularly true of the so-called nutating piston liquid meter. When delivering at the rate of 5 gallons per minute (slow), a much greater proportion of the total flow occurs by leakage, than when delivering at the rate of twenty gallons per minute (fast). The principal reason for this excess amount of liquid passing by leakage at slow rates of delivery is the time element. The leakage through the meter and by-pass is practically a fixed amount per unit of time within very small variations due to the pressure used. Since it is customary to operate gasoline dispensing pumps at a fixed pressure, by employing, for example, an electrically driven pump having a spring controlled by-pass arrangement, the variations due to pressure changes may substantially be disregarded.

Thus, if the by-pass and leakage volume through the meter is 15 cubic inches to correct the measure of 5 gallons in 20 seconds, then if the discharge nozzle is throttled to discharge 5 gallons in 60 seconds, the leakage will have three times the period of time in which to affect the measurement, and roughly 45 cubic inches will pass, over and above the amount which has been operating to move the piston of the meter, representing an over-measure of 30 cubic inches which is not registered by the counting system. In an actual test on a nutating liquid piston meter of the so-called Pittsburg type, the closest adjustment obtainable by by-pass control was zero at 5 gallons in 20 seconds and plus 15 cubic inches when 5 gallons were discharged in 60 seconds.

It is now proposed to compensate for this deficiency in flow meters by providing a return of liquid from the outlet of the meter to the inlet of the pumping system, which in itself will pass substantially a fixed amount of liquid per unit of time with minor variations due to the pressures employed.

A further object of the present invention is to provide a system which may be adjusted to compensate the particular meter to which it is attached to attain substantially the same registration on the counting system regardless of the leakage in the particular meter and regardless of the rate of flow through the metering and by-pass system.

A further object of the invention is to provide means operating in conjunction with the meter and its compensating device to cause the rate-compensation system to operate only while a liquid is flowing.

One form of a construction of a device is set forth in the accompanying drawings to illustrate the application of the principles involved, in which.

Figure 1:
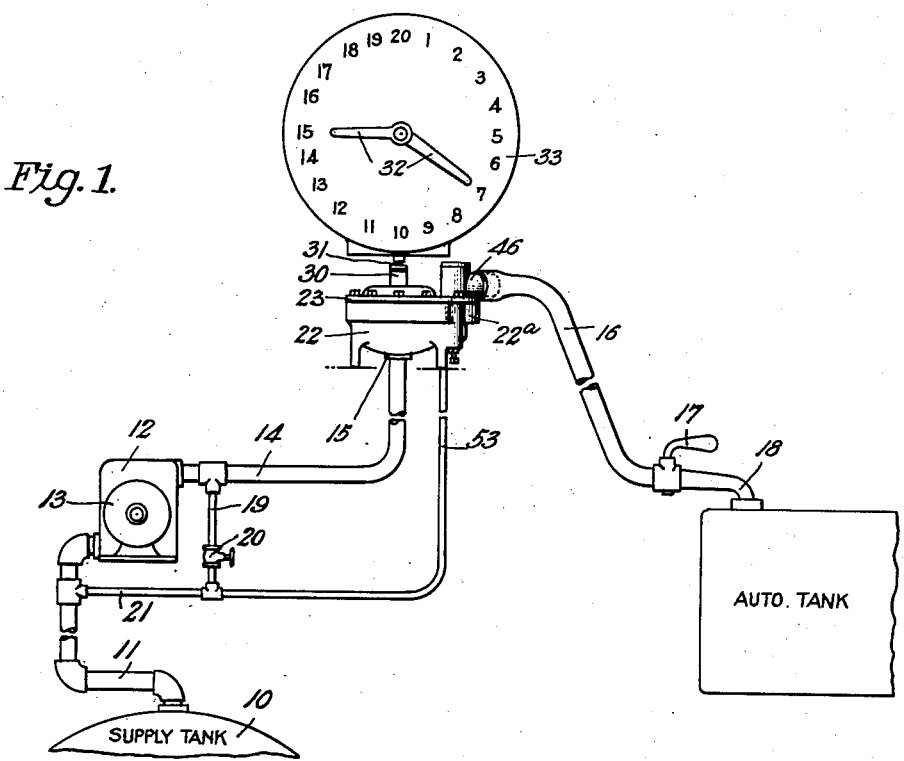
Fig. 1 is a diagrammatic view of a liquid dispensing and measuring system, including the compensator of the present invention.

In these drawings, the supply tank 10 is normally located at a low level and is provided with a suction pipe 11 through which liquid may be drawn by the pump 12 which is driven by an electric motor 13. The pump 12 delivers the liquid through a discharge pipe 14 into the base connection 15 of the liquids meter, so that the liquid after transversing the meter will flow through the discharge base 16 and the controlling valve 17 to the discharge nozzle 18 from which it may be dispensed to an automobile tank, for example.

The pump 12 is provided with a by-pass from the outlet pipe 14 comprising the pipe 19, the adjustable spring control by-pass valve 20 and the pipe 21 which opens into the inlet pipe 11 of the pump 12. The by-pass valve 20 may be of any well known construction and operates when the pressure in the outlet pipe 14 or pump 12 exceeds a predetermined maximum to permit the downward passage of fluid in the pipe 19, past the valve 20, into the return pipe 21; but operates in the normal manner to shut off this passage when not exceeding such predetermined pressure prevails in pipe 14. A control handle is indicated in the drawings for regulating this predetermined pressure at which the by-pass valve 20 will open. It will be understood that the pump 12, when driven, draws liquid from the tank 10 and forces it to the discharge nozzle 18. When the valve 17 is closed the back pressure resulting causes the pressure of liquid in the pipe 14 to open the spring by-pass valve 20 so that there is a circulation of liquid through the pump 12, through the by-pass valve 20 back to the inlet of the pump. Thus a substantially constant head of liquid pressure is maintained in the delivery pipe 14. This combination of the pump 12 with the by-pass pipes 19, 21 and the automatic by-pass valve 20 therefore constitutes a pump system capable of delivering liquid under a substantially constant head of pressure in the pipe 14 and to maintain this pressure regardless of obstruction or valve closing in the pipe 14 or any associated discharge line; for which purpose the pump 12 is as usual constructed to be competent of delivering liquid at such constant head when the outlet valve 17 is wide open.

The nutating piston liquids meter is shown of a standard type to comprise the lower casing 22 with the cover 23 secured thereto. Lower casing 22 is formed with the base connection 15 so that the liquid from the pipe 14 is admitted to the interior of the casing. Within the casing is a piston cylinder or cell comprising the lower half 24 and the upper half 25 which fit tightly together and are provided with the usual liquid chamber to receive the nutating piston 26 which is formed as a disc surrounding a ball 27, this ball 27 being mounted in the spherical portion 28 of the lower half 24. The upper half has a circular hole through which projects the pin 29 of the ball. The cover 23 has a boss 30 with a packing gland therein for the shaft 31, which leads to the registering train which operates the hands 32 over the dial 33 (Fig. 1). The shaft 31 has a radially extending slotted arm 34 to be engaged by the pin 29 in the usual manner.

The piston disc 26 is slotted radially to receive the partition 35 which is fixed in the walls of the cell halves 24, 25, and serves to prevent rotation of the piston 26 as well as to divide the liquids chamber into receiving and discharging portions, in conjunction with the piston 26. A passage 36 extends from the receiving chamber 37 located beneath the lower half 24, and extends upwardly as a passage 38 opposite the opening 39 through the cell walls. The passage 38 and the opening 39 are located closely adjacent the partition 35. At the opposite side of this partition is a similar opening 40 through the cell walls leading to a passage 41 in the casing 22.

From the passage 38 branches a cavity 43 from which a hole 44 extends upwardly to a transverse passage 45 leading into the discharge pipe 46 to which the hose 16 is connected. A needle valve 47 may be moved upwardly and downwardly whereby to obstruct the entrance to the hole 44, more or less, so that the passage of liquid from the inlet 38 to the outlet 46 of the meter may be varied in order to compensate for variations in leakage past the piston and similar walls of the meter.

Figure 4:
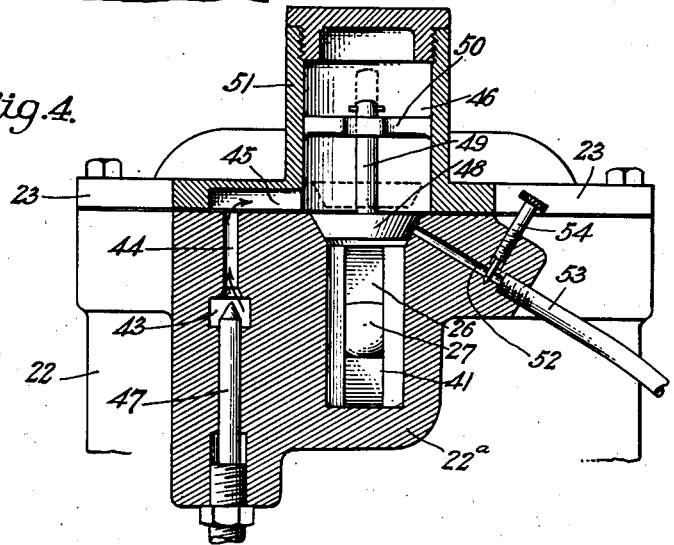
Fig. 4 is a vertical sectional view substantially on the broken line 4—4 of Fig. 3.
Figure 2:
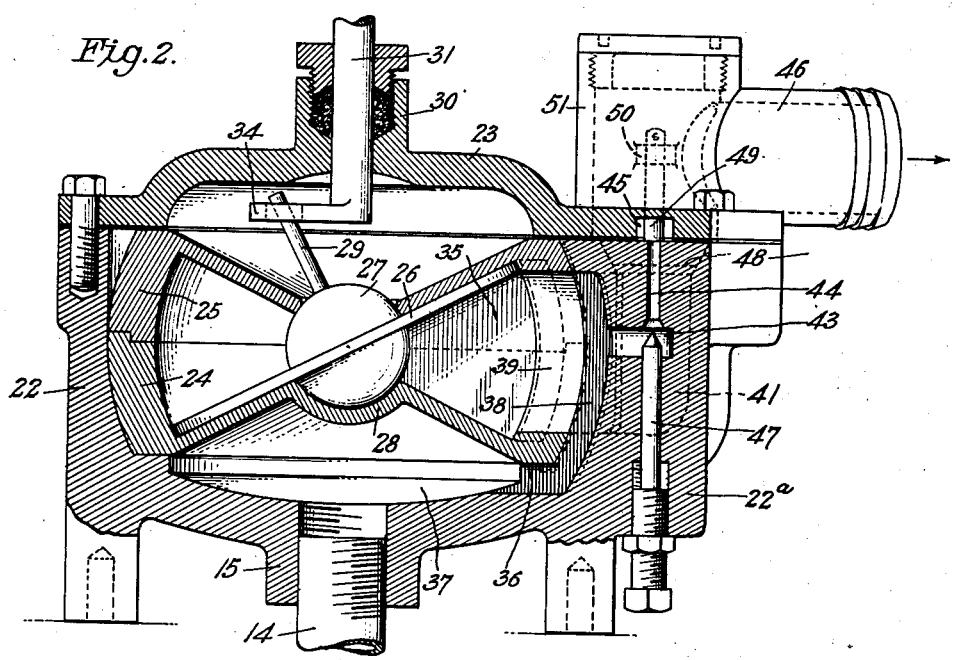
Fig. 2 is a diametrical sectional view through a nutating piston liquids meter with the present type of compensator.
Figure 3:
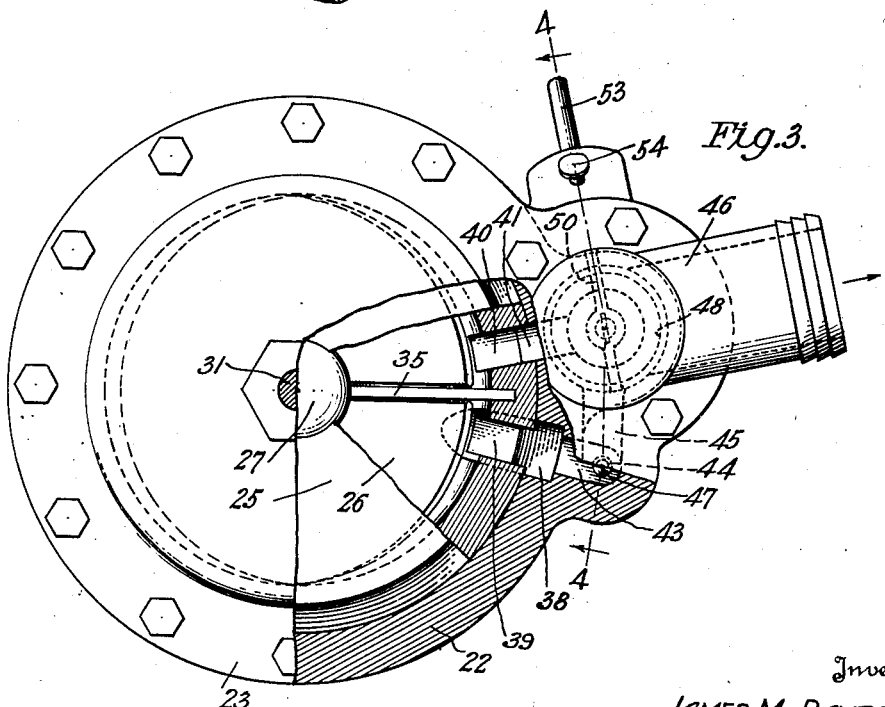
Fig. 3 is a plan view of the same with parts broken away to the show the relations of the several parts.

It is preferred to employ a check valve between the casing passage 41 and the outlet 46. This valve is illustrated in Fig. 4 as having the valve head 48 adapted to engage a seat in the projecting boss 22a of the casing 22 (Fig. 4), and a stem 49 connected thereto and guided by the bridge 50 formed integrally with the wall 51 constituting a part of the cover 23 in the form shown and having a central cavity so that it constitutes an outlet for the conduit 46. In the boss 22a is provided a passage 52 which opens into the passage 41 and the conduit 46 at a point which is covered by the valve head 48 when the latter is seated. This passage 52 establishes a connection with the pipe 53 which leads to the return pipe 21 of the automatic by-pass valve 20. The flow through the passage 52 and the pipe 53 may be adjusted by a needle valve 54.

The operation of the meter and its associated parts is as follows:

The motor 13 is started and the pump 12 begins to operate so that a pressure head of liquid is established in the pipe 14 and the hose line 16, being prevented from escape by the closure of the valve 17. The hands 32 are moved to zero. The nozzle 18 is placed in an automobile tank, for example, and the valve 17 is opened. Gasoline now flows through the nozzle 18 into the tank and the pump continues to deliver at the fixed pressure. The liquids flowing through pipe 14 into passages 36 and 38 thus enter the liquids chamber in the cell halves 24, 25 and cause a nutating movement of the piston 26; a fixed volume of liquid travels around with the piston as it moves. This volume of liquid is ultimately discharged through the passages 40, 41 and raises the valve 48 and thus flows through the outlet 46 and the hose 16 to the automobile tank. The nutating movement of the piston 26 causes the upper end of the pin 29 to move in a circular path and thus operates the shaft 31 and therewith the hands 32. Owing to the loose fitting of the piston 26 liquid will escape around its edges and along the margins of the slot which receives the partition 35 and thus flows to the outlet 46 through the passages 40, 41, without constituting a part of the volume of liquid which has caused the movement of the piston 26. This may be referred to as "leakage". This leakage may vary in amount between different meters of the same type and apparently of the same size. With a given rate of flow, say 5 gallons in 15 seconds, the needle valve 47 is then moved until the delivery from the nozzle 18 exactly corresponds to the quantity registered by the hands 32. That is, the total volume of liquid which leaks around the piston and through other parts, and of the liquid passing through the by-pass hole 44, is constant among the several meters of the type, considered in conjunction with the gearing ratio between the shaft 31 and the hands 32. This is standard practice and is not claimed herein.

If, however, the valve 17 is closed, as is usually the case toward the end of a dispensing operation, until a slow discharge, of say 5 gallons in 60 seconds is passed, then the quantity of liquid actually delivered would be greater than the quantity shown by the hands 32, except that according to the present invention a part of the liquid passing to the outlet 46 from the meter discharge passage 41 is diverted into the passage 52 and flows through pipes 53 and 21 back to the pump inlet. This volume may be controlled by the needle valve 54. It is found, however, that if the pipe 53 is of small cross-sectional area, that in many instances a regulation of the valve 54 is not required and this valve may even be eliminated. As set forth above, the leakage and by-pass volumes appear substantially to be fixed in amount per unit of time under the conditions of operation: and the same is true of the liquid passed through the pipe 53.

It is obvious that the invention may be employed in many ways without departing from the scope of the appended claims.

I claim:

1. A liquid measuring apparatus including a pump system to deliver liquid at a substantially constant pressure and having an inlet and an outlet, a fluid volume metering device connected to said outlet and having unmetered leakage losses and including a discharge means for providing a by-pass from said outlet to said discharge, and further means for providing a return passage from said discharge to said inlet.

2. A liquid measuring apparatus including a pump system to deliver liquid at a substantially constant pressure and having an inlet and an outlet, a fluid volume metering device having an indicator and connected to said outlet and having unmetered leakage losses and including a discharge, valve means for controlling the rate of flow through said discharge, means for providing a by-pass from said outlet to said discharge, a regulating device for said by-pass, further means for providing a return passage from said discharge to said inlet, and means for regulating the flow through said return passage, whereby the portion of the total discharge which passes through said meter at high and low rates of flow will produce the same indication with the passage of the same volume regardless of the rate of flow.

3. A liquid measuring apparatus including a pump system to deliver liquid at a substantially constant pressure and having an inlet and an outlet, a fluid volume metering device connected to said outlet and having unmetered leakage losses and including a discharge, a check valve located in said discharge and having a seat, means for providing a by-pass from said outlet to said discharge, and a conduit opening at said valve seat and providing a return passage from said discharge to said inlet.

4. A liquid measuring apparatus including a pump system to deliver liquid at a substantially constant pressure and having an inlet and an outlet, a fluid volume metering device connected to said outlet and having unmetered leakage losses and including a discharge, means for providing a by-pass from said outlet to said discharge, a conduit for providing a return passage from said discharge to said inlet, and means restricting the flow through said conduit.

5. A liquid measuring apparatus including a pump system to deliver liquid at a substantially constant pressure and having an inlet and an outlet, a fluid volume metering device connected to said outlet and having unmetered leakage losses and including a discharge, a check valve located in said discharge and having a seat, means for providing a by-pass from said outlet to said discharge, a conduit opening at said valve seat and providing a return passage from said discharge to said inlet, and means to regulate the flow of liquid through said return passage.

6. A liquid measuring apparatus including a pump system to deliver liquid at a substantially constant pressure and having an inlet and an outlet, a fluid volume metering device having an indicator and connected to said outlet and having unmetered leakage losses and including a discharge, a shut-off valve to close said discharge, a check valve located between said metering device and said shut-off valve and having a valve seat, means for providing a by-pass from said outlet to said discharge, a regulating device for said by-pass, a conduit opening into said discharge at said valve seat and providing a return passage from said discharge to said inlet, whereby to return a portion of the total discharge when said check valve is open, and means to regulate the flow of liquid through said return passage.

7. A liquid measuring apparatus including a pump system to deliver liquid at a substantially constant pressure and having an inlet and an outlet, a fluid volume metering device connected to said outlet and having unmetered leakage losses and including a discharge, a valve for controlling the flow through said discharge, a check-valve located between said device and said controlling valve and having a seat, means for providing a by-pass from said outlet to said discharge and opening into said discharge at a point between said seat and said control valve, and a conduit opening at said valve seat and providing a return passage from said discharge to said inlet, and means to regulate the flow of liquid through said return passage.

8. A liquid measuring apparatus including a pump having an inlet and an outlet, a by-pass from said outlet to said inlet and including a spring control valve to permit the return of liquid when the pressure in said outlet exceeds a predetermined maximum, a volumentrically operating fluid volume metering device connected to said outlet and having unmetered leakage losses and including a discharge, a valve for controlling the rate of flow from said discharge, means for providing a by-pass from said outlet to said discharge, and further means for providing a return passage from said discharge to said inlet.

In testimony whereof, I affix my signature.
JAMES M. DAYTON.